(12) United States Patent
Wang et al.

(10) Patent No.: US 10,671,224 B2
(45) Date of Patent: Jun. 2, 2020

(54) CELL TOUCH SCREEN, METHOD FOR DRIVING THE SAME, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Deshuai Wang, Beijing (CN); Xinyou Ji, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/561,559

(22) PCT Filed: Apr. 10, 2017

(86) PCT No.: PCT/CN2017/079962
§ 371 (c)(1),
(2) Date: Sep. 26, 2017

(87) PCT Pub. No.: WO2017/193745
PCT Pub. Date: Nov. 16, 2017

(65) Prior Publication Data
US 2018/0196545 A1   Jul. 12, 2018

(30) Foreign Application Priority Data

May 13, 2016  (CN) .......................... 2016 1 0320032

(51) Int. Cl.
*G06F 3/041* (2006.01)
*G06F 3/044* (2006.01)

(52) U.S. Cl.
CPC ............ *G06F 3/044* (2013.01); *G06F 3/0412* (2013.01); *G06F 3/0416* (2013.01);
(Continued)

(58) Field of Classification Search
None
See application file for complete search history.

(56) References Cited

U.S. PATENT DOCUMENTS

2012/0120005 A1   5/2012  Kim
2012/0139848 A1   6/2012  Lee et al.
(Continued)

FOREIGN PATENT DOCUMENTS

CN       2911707 Y      6/2007
CN     101825787 A      9/2010
(Continued)

OTHER PUBLICATIONS

Search Report and Written Opinion for International Application No. PCT/CN2017/079962 dated Jun. 28, 2017.
(Continued)

*Primary Examiner* — Brian M Butcher
(74) *Attorney, Agent, or Firm* — Calfee, Halter & Griswold LLP

(57) ABSTRACT

The present disclosure provides an in cell touch screen including a plurality of touch electrodes and a shade structure, wherein the shade structure includes a plurality of first shade bars arranged in parallel along a first direction and a plurality of second shade bars arranged in parallel along a second direction perpendicular to the first direction; and the first shade bars are conductive, and the touch electrodes are electrically connected to the first shade bars, respectively.

12 Claims, 9 Drawing Sheets

(52) U.S. Cl.
CPC .............. *G06F 2203/04103* (2013.01); *G06F 2203/04111* (2013.01); *G06F 2203/04112* (2013.01)

(56) References Cited

U.S. PATENT DOCUMENTS

2015/0261370 A1* 9/2015 Yoo .................. G06F 3/0412
                                                    345/173
2016/0266676 A1   9/2016 Wang et al.

FOREIGN PATENT DOCUMENTS

| | | |
|---|---|---|
| CN | 103268036 A | 8/2013 |
| CN | 203299763 U | 11/2013 |
| CN | 103488341 A | 1/2014 |
| CN | 203588224 U | 5/2014 |
| CN | 103926736 A | 7/2014 |
| CN | 103941447 A | 7/2014 |
| CN | 104020908 A | 9/2014 |
| CN | 104635372 A | 5/2015 |
| CN | 105786263 A | 7/2016 |
| EP | 3153954 A1 | 4/2017 |
| JP | 2014071734 | 4/2014 |

OTHER PUBLICATIONS

First Office Action for Chinese Patent Application No. 201610320032.9 dated Jan. 20, 2018.

\* cited by examiner

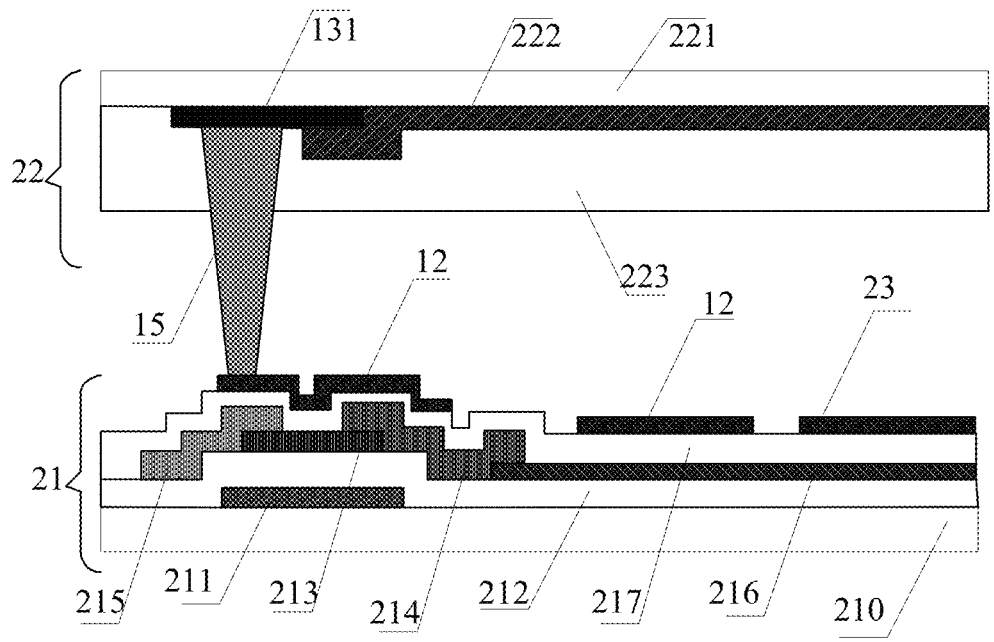

Fig. 9 during a touch period of the touch screen, a touch detecting signal is applied respectively through a first shade bar to a touch electrode electrically connected to the first shade bar in the touch screen — S901 a touch sensing signal fed back form the touch electrode in response to the touch detecting signal is received through the first shade bar — S902 the area in the touch screen in which the touch took place is determined according to the difference among each touch detecting signal and touch sensing signal and the position of the touch electrode connected to the respective first shade bar — S903

Fig. 10

CELL TOUCH SCREEN, METHOD FOR DRIVING THE SAME, AND DISPLAY DEVICE

CROSS REFERENCE

The present application is based upon International Application No. PCT/CN2017/079962, filed on Apr. 10, 2017, which is based upon and claims priority to Chinese Patent Application No. 201610320032.9, filed on May 13, 2016, and the entire contents thereof are incorporated herein by reference.

TECHNICAL FIELD

The present disclosure relates to the field of display technology, in particular, to an in cell touch screen, a method for driving the same, and a display device.

BACKGROUND

With the rapid develop of display technology, touch screens have been widely used in daily lives. Currently, according to the constituent structure, the touch screen can be classified into: an add on mode touch panel, an on cell touch panel, and an in cell touch panel. Among them, the add on mode touch panel is manufactured by separately forming a liquid crystal display (LCD) and a touch screen and then adjoining them together to form an LCD panel with touch function. The add on mode touch panel has shortcomings such as high manufacturing cost, low light transmittance, and thicker module. The in cell touch panel, however, is favored by major panel manufactures since its touch electrodes of the touch screen are embedded inside the LCD panel, thereby reducing the overall thickness of the module and greatly reducing the manufacturing cost of the touch screen.

At present, the existing in cell touch screen detects a position of the finger touch according to the mutual capacitance or self-capacitance principle. According to the self-capacitance principle, a plurality of self-capacitive touch electrodes may be arranged in the same layer and insulated from each other in the touch screen. When the human body does not touch the screen, the capacitance born by each touch electrode may be a constant value, when the human body touches the screen, the capacitance born by the corresponding touch electrode may be the constant value superimposed on the body capacitance, and the touch position may be judged by a touch detecting chip by detecting the change in the capacitance value of each touch electrode during the touch period. As the human body capacitance may act on all of the self-capacitance, it is possible to improve the touch signal to noise ratio and thus improve the accuracy of touch sensing in comparison to the mutual capacitance touch screen, in which the capacitance caused by human body touch may act only on the projective capacitance in the mutual capacitance and thus the change caused by the touch is larger than that in the mutual capacitance touch panel.

It should be noted that, information disclosed in the above background portion is provided only for better understanding of the background of the present disclosure, and thus it may contain information that does not form the prior art known by those ordinary skilled in the art.

SUMMARY

The present disclosure provides an in cell touch screen, a method for driving the same, and a display device.

Embodiments of the present disclosure provide an in cell touch screen, including a plurality of touch electrodes and a shade structure, wherein the shade structure includes a plurality of first shade bars arranged in parallel along a first direction and a plurality of second shade bars arranged in parallel along a second direction perpendicular to the first direction; and the first shade bars are conductive, and the touch electrodes are electrically connected to the first shade bars, respectively.

Correspondingly, embodiments of the present disclosure further provide a display device including any in cell touch screen according to embodiments of the present disclosure.

Correspondingly, embodiments of the present disclosure further provide a method for driving any in cell touch screen according to embodiments of the present disclosure, the method includes:

during a touch period of the touch screen, applying, through the first shade bar, a touch detecting signal to the touch electrode electrically connected to the first shade bar in the touch screen, respectively;

receiving, through the first shade bar, a touch sensing signal fed back from the touch electrode in response to the touch detecting signal; and determining an area in the touch screen in which the touch took place according to the difference among each touch detecting signal and touch sensing signal and the position of the touch electrode connected to the respective first shade bar.

It is to be understood that both the foregoing general description and the following detailed description are exemplary and explanatory only and are not restrictive of the present disclosure, as claimed.

This section provides a summary of various implementations or examples of the technology described in the disclosure, and is not a comprehensive disclosure of the full scope or all features of the disclosed technology.

BRIEF DESCRIPTION OF THE DRAWINGS

The accompanying drawings are provided for a further understanding of the present disclosure and constitute a part of the specification, and together with the following detailed description, serve to explain the present disclosure, but are not to be construed as limiting the disclosure. In the drawings:

FIG. 9 is a structural schematic diagram of another in cell touch screen according to a second embodiment of the present disclosure; and FIG. 10 is a schematic flow chart of a method for driving an in cell touch screen according to an embodiment of the present disclosure.

DETAILED DESCRIPTION

Figure 1:
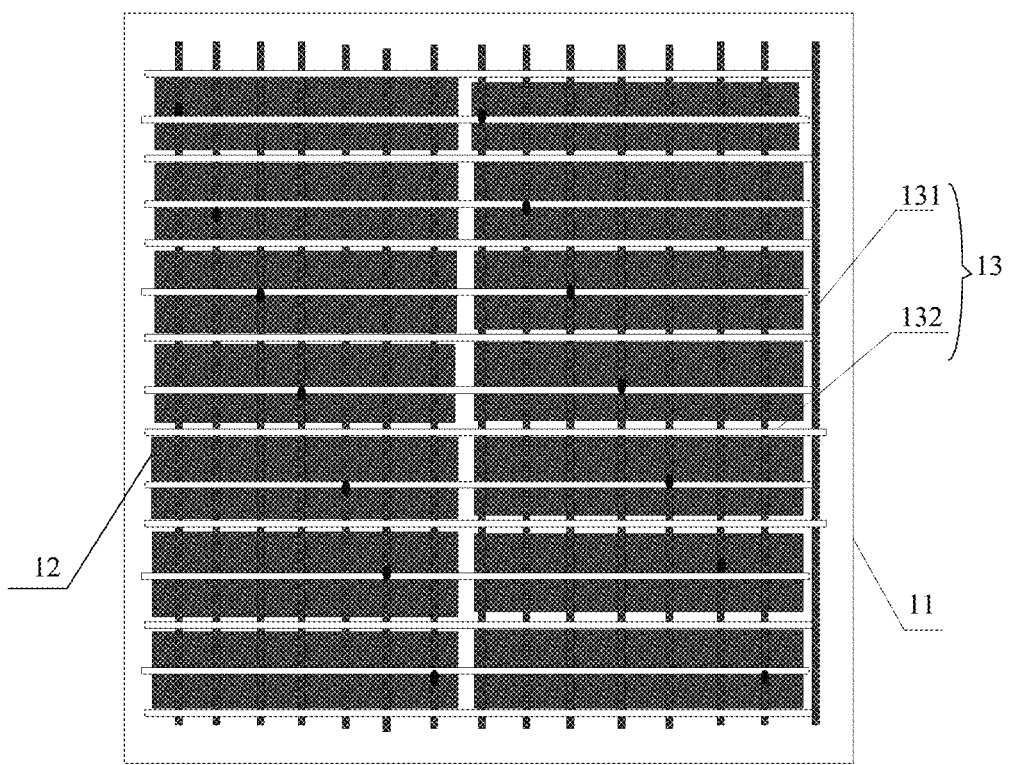
FIG. 1 is a structural schematic diagram of an in cell touch screen according to an embodiment of the present disclosure.

Hereinafter, the present disclosure will be described in further detail with reference to the accompanying drawings, such that the objectives, technical solutions and advantages of the present disclosure may be more apparent. Obviously, the described embodiments are merely part embodiments of the present disclosure, and not all embodiments. All other embodiments obtained based on embodiments in the present disclosure by those of ordinary skill in the art without making creative work are within the protection scope of the present disclosure.

The present disclosure provides an in cell touch screen, a method for driving the same, and a display device, to achieve touch control without affecting the pixel aperture ratio.

Hereinafter, specific implementations of the in cell touch screen, the method for driving the same, and the display device according to the embodiments of the present disclosure will be described in detail with reference to the accompanying drawings.

The thickness and shape of the films in the layers in the drawings do not reflect the true proportions, and the purpose thereof is merely illustrative of contents of the present disclosure.

Embodiments of the present disclosure provides an in cell touch screen, which is applicable in a liquid crystal display (LCD) panel of twisted nematic (TN) mode or advanced super dimension switch (ADS) mode. The ADS mode is a core technology of a planar electric field wide viewing angle, and the core technical characteristics may be described as: forming a multidimensional electric field by an electric field generated at the edge of the slit electrode in the same plane and the electric field generated between the slit electrode layer and the plate electrode layer, such that all the orientated liquid crystal molecules between the slit electrodes and right above the electrodes may rotate, thereby improving the operation efficiency of the liquid crystal and increasing the light transmission efficiency. The ADS mode switching technology may improve the image quality of the TFT-LCD products, with high resolution, high transmittance, low power consumption, wide viewing angle, high aperture ratio, low color difference, no push Mura, or the like. For different applications, the advanced ADS technology may include the I-ADS technology with high transmittance, the H-ADS technology with high aperture ratio, and the S-ADS technology with high resolution.

In the embodiments of the present disclosure, the in cell touch screen includes the in cell touch screen in which both the touch electrode and the shade structure are provided in the same substrate, and also includes the in cell touch screen in which the touch electrode and the shade structure are provided in different substrates. For example, both the touch electrode and the shade structure are provided on the array substrate of the touch screen, or both the touch electrode and the shade structure are provided on the opposite substrate of the touch screen, or the touch electrode is provided on the array substrate of the touch screen while the shade structure is provided on the opposite substrate of the touch screen, or the touch electrode is provided on the opposite substrate of the touch screen while the shade structure is provided on the array substrate of the touch screen.

In one embodiment, the touch electrode according to embodiments of the present disclosure may have a blocky structure, or a structure such as a circular shape, a bar shape or the like, which is not limited herein.

Referring to FIG. 1, in the in cell touch screen according to the embodiment of the present disclosure, the in cell touch screen 11 includes a plurality of touch electrodes 12 and a shade structure 13. The shade structure 13 includes a plurality of first shade bars 131 arranged in parallel along a first direction and a plurality of second shade bars 132 arranged in parallel along a second direction perpendicular to the first direction. The first shade bars 131 are conductive, and each touch electrode 12 and each first shade bar 131 are in one to one correspondence and are electrically connected.

In the above embodiment, each touch electrode 12 and each first shade bar 131 are illustrated to be in one to one correspondence, while the present disclosure is not limited thereto. In other embodiments, the number of the touch electrodes 12 may be different from the number of the first shade bars 131. In this case, there may be a plurality of first shade bars 131 connected to the same touch electrode 12, or some of the first shade bars 131 are not connected to any touch electrode 12. The present disclosure is not limited thereby as long as the touch electrodes 12 are electrically connected to the shade bars 131, respectively. For example, the touch electrode 12 may be electrically connected to at least one first shade bar 131, and may be connected to the drive circuit via the at least one first shade bar 131.

It should be noted that, the first direction may be the lateral direction and the second direction may be the longitudinal direction, or the first direction may be the longitudinal direction and the second direction may be the lateral direction. The present disclosure is not particularly limited thereto. In the embodiments of the present disclosure, the shade structure includes a pattern of black matrix in the array substrate or the opposite substrate. However, the present disclosure is not limited thereto. For example, in an embodiment of the present disclosure, the shade structure may be a structure formed in the area between the sub pixels of the in cell touch screen for shading external light and/or light emitted from adjacent sub pixels, or a structure having similar function. In the embodiment illustrated in FIG. 1, only the first shade bars along the lateral direction are designed to be conductive, while the present disclosure is not limited thereto, the shade structure arranged along the longitudinal direction may also be taken as the first shade bare and designed to be conductive.

Figure 2:
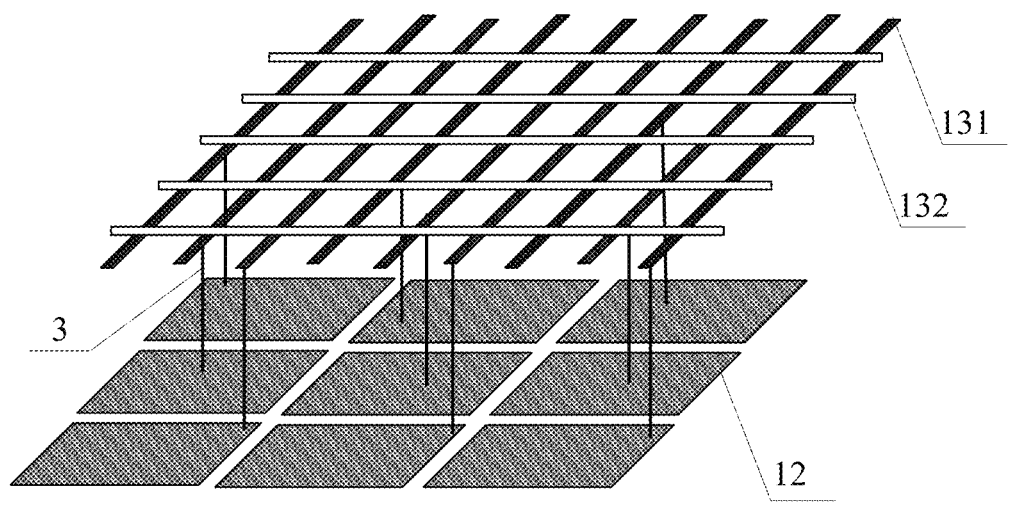
FIG. 2 is a perspective structural schematic diagram of an in cell touch screen according to an embodiment of the present disclosure.

In particular, in order to further explain the structure of the in cell touch screen according to the embodiment of the present disclosure, an embodiment of the present disclosure further provides a perspective structure scheme of the in cell touch screen. As illustrated in FIG. 2, the touch electrode 12 may have but is not limited to a blocky shape. The first shade bars 131 and the second shade bars 132 are shade structures arranged in the same layer, and the first shade bar 131 is electrically connected to the corresponding touch electrode 12 through a connection structure 3, wherein the connection structure may be connected through a via hole disposed in the layer structures between the first shade bar 131 and the touch electrode, or may also be connected through other structures such as a supporter or the like. The present disclosure is not limited thereto.

The in cell touch screen according to the present disclosure includes a plurality of touch electrodes and a shade structure, the shade structure including a plurality of first shade bars arranged in parallel along a first direction and a plurality of second shade bars arranged in parallel along a second direction perpendicular to the first direction, wherein the first shade bars are conductive, and each touch electrode and each first shade bar are in one to one correspondence and are electrically connected. In the present disclosure, the first shade bars in the shade structure of the touch screen are formed to be conductive and serve as signal lines connected to the touch electrode. In particular, the first shade bare connected to the touch electrode is configured to send the touch detecting signal from the driving integrated circuit to the touch electrode, and a signal line is configured to feedback the touch sensing signal generated after the touch electrode receives the touch detecting signal to the driving integrated circuit when a human body touches the touch screen, thereby realizing the self-capacitive touch function. Accordingly, in the in cell touch screen according to the embodiment of the present disclosure, the first shade bar in the shade structure is multiplexed into a signal line, so as to realize the touch control function without affecting the aperture ratio of the touch screen.

Figure 3:
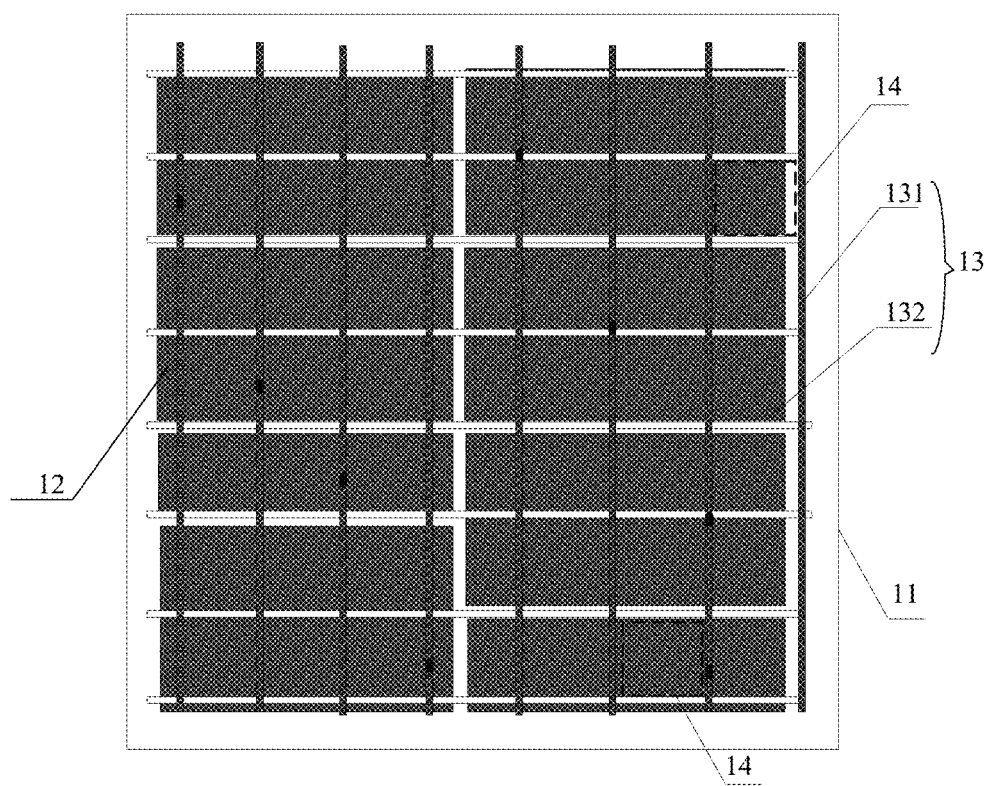
FIG. 3 is a structural schematic diagram of a second in cell touch screen according to an embodiment of the present disclosure.

In a particular embodiment, referring to FIG. 3, in the above in cell touch screen according to the embodiment of the present disclosure, a sub pixel unit 14 is formed by a region where the first shade bar 131 and the second shade bar 132 are intersected, and each touch electrode corresponds to a plurality of sub pixel units 14. In particular, in order to increase the resolution of the display, the sub pixel unit, as the smallest unit of the display, has a smaller and smaller area. The touch electrode for the touch function is configured to realize the touch function, and thus the area of each touch electrode may be formed to be relatively larger, and meanwhile reducing the number of the signal lines connected to the touch electrode. Preferably, each touch electrode corresponds to a plurality of sub pixel units. In FIG. 2, for example, it illustrates only a structure schematic diagram in which one touch electrode corresponds to three sub pixel units, or one touch electrode corresponds to six sub pixel units. However, the present disclosure is not limited thereto, and of course one touch electrode may correspond to more subpixel units, which is not limited herein. The shape and size of each touch electrode are not particularly limited herein.

In a particular embodiment, in the in cell touch screen according to the embodiment of the present disclosure, the first shade bar, as a conductive structure, may be formed with a material having light blocking property and electrical conductivity, e.g., a metal material, while forming the first shade bar. Also, it is possible to coat a first conductive layer on the structural surface of an existing first shade bar. In the embodiment, the first conductive layer is a transparent conductive layer, or the first conductive layer is formed of a metal material or a metal oxide.

In a particular embodiment, the in cell touch screen according to the embodiment of the present disclosure further includes a first substrate and a second substrate that are aligned. The touch electrode and the first shade bar are provided on the same substrate, or the touch electrode and the first shade bar are provided on different substrates, respectively.

It should be noted that the first substrate is an opposite substrate and the second substrate is an array substrate, or the first substrate is the array substrate and the second substrate is the opposite substrate.

The in cell touch screen according to the embodiment of the present disclosure includes the in cell touch screen in which both the touch electrode and the first shade structure are provided in the same substrate, and also includes the in cell touch screen in which the touch electrode and the first shade structure are provided in different substrates. For example, both the touch electrode and the first shade structure are provided on the array substrate of the touch screen, or both the touch electrode and the first shade structure are provided on the opposite substrate of the touch screen, or the touch electrode is provided on the array substrate of the touch screen while the first shade structure is provided on the opposite substrate of the touch screen, or the touch electrode is provided on the opposite substrate of the touch screen while the first shade structure is provided on the array substrate of the touch screen.

Figure 4:
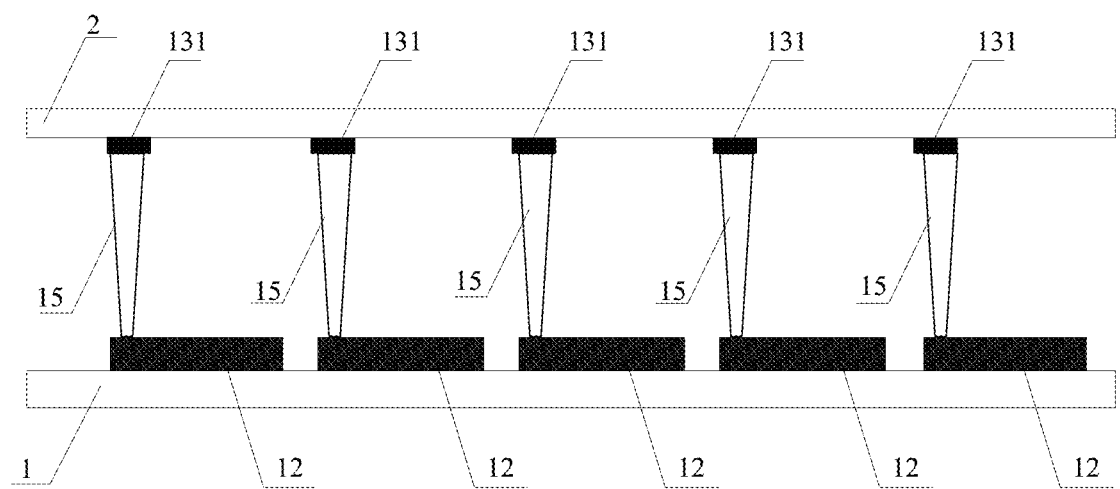
FIG. 4 is a structural schematic diagram of a third in cell touch screen according to an embodiment of the present disclosure.

In a particular embodiment, in the above in cell touch screen according to the embodiment of the present disclosure, referring to FIG. 4, when the touch electrode and the first shade bar are provided on different substrates, the touch electrode 12 is provided on the first substrate 1, and the first shade bar 131 is provided on the second substrate 2. The touch screen further includes a conductive supporter 15 provided between the first shade 131 and the touch electrode 12, and each touch electrode 12 is electrically connected to the first shade bar 131 corresponding to the touch electrode through the supporter 15. In the embodiment, for example, FIG. 3 illustrates only that the touch electrode is provided on the first substrate and the first shade bar is provided on the second substrate. The first substrate may be the opposite substrate and the second substrate may be the array substrate, or the first substrate may be the array substrate, and the second substrate may be the opposite substrate.

In a particular embodiment, referring to FIG. 4, in the above in cell touch screen according to the embodiment of the present disclosure, a projection of the supporter 15 on the first substrate 1 or the second substrate 2 is positioned within an area of a projection of the first shade bar 131 on the first substrate 1 or the second substrate 2, so as to further avoid affecting the aperture ratio of the in cell touch screen.

Figure 5:
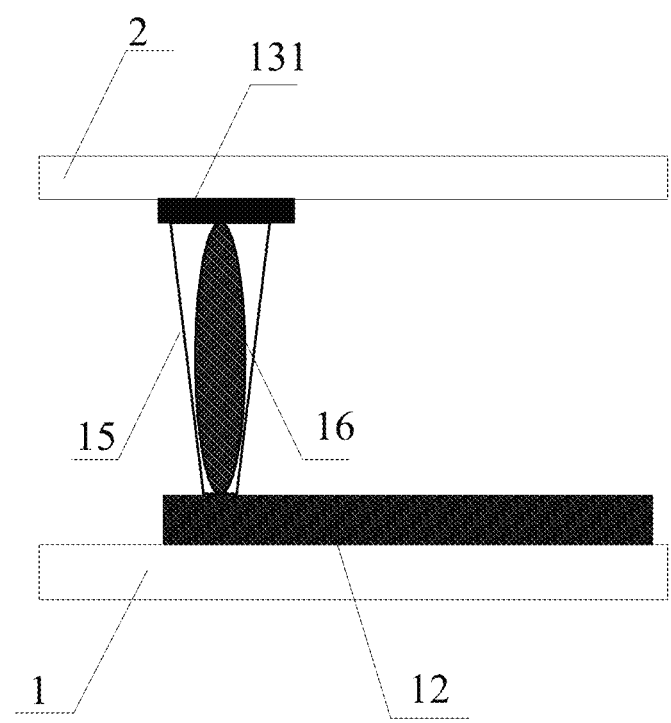
FIG. 5 is a structural schematic diagram of a fourth in cell touch screen according to an embodiment of the present disclosure.

In a particular embodiment, the supporter is conductive, such that the supporter according to the embodiment of the present disclosure serves to connect the first shade bar and the touch electrode. Referring to FIG. 5, in the above in cell touch screen according to the embodiment of the present disclosure, a conductive silicon ball 16 is provided inside the supporter 15.

Figure 6:
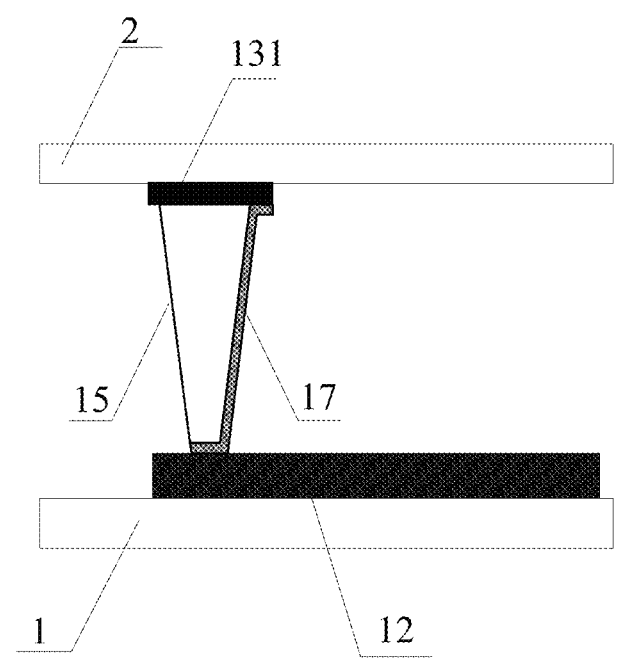
FIG. 6 is a structural schematic diagram of a fifth in cell touch screen according to an embodiment of the present disclosure.

In a particular embodiment, the supporter is conductive, such that the supporter according to the embodiment of the present disclosure serves to connect the first shade bar and the touch electrode. Referring to FIG. 6, in the above in cell touch screen according to the embodiment of the present disclosure, a second conductive layer 17 is coated on a part of the surface of the supporter 15, and the second conductive layer 17 serves to electrically connect the touch electrode 12 and the first shade bar 131 corresponding to the touch electrode.

It should be noted that, coating the second conductive layer on a part of the surface of the supporter may include coating the second conductive layer on a first surface of the supporter that is in contact with the first substrate and a part of a second surface of the supporter that is not in contact with the first substrate and the second substrate. In particular, it is not limited that the second conductive layer is coated on which surface of the supporter, as long as the second conductive layer coated on the surface of the supporter electrically connects the first shade bar and the touch electrode.

Figure 7:
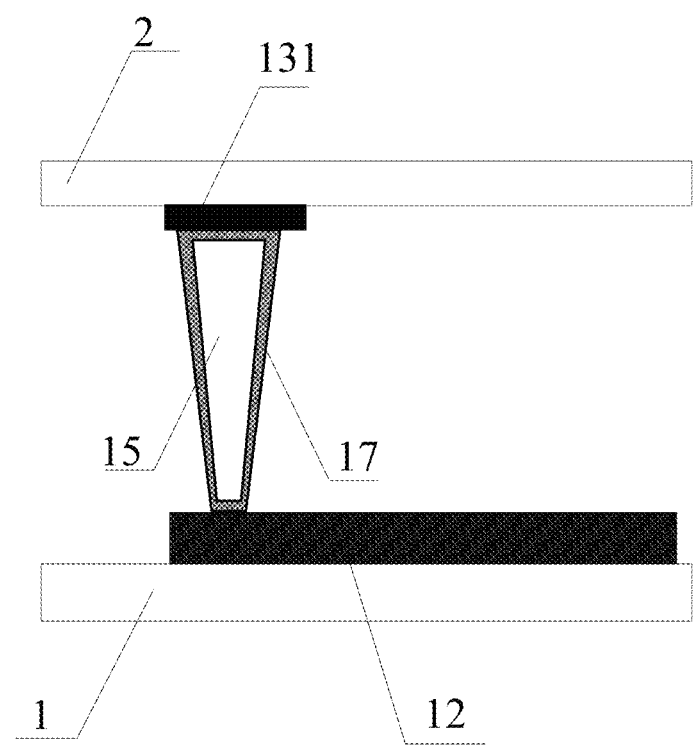
FIG. 7 is a structural schematic diagram of a sixth in cell touch screen according to an embodiment of the present disclosure.

Further in a particular embodiment, the supporter is conductive, such that the supporter according to the embodiment of the present disclosure serves to connect the signal line and the touch electrode. Referring to FIG. 7, in the above in cell touch screen according to the embodiment of the present disclosure, a second conductive layer 17 is coated over all the surfaces of the supporter 15, such that the supporter may form a good connection.

In a particular embodiment, the second conductive layer according to the embodiment of the present disclosure may be a transparent conductive layer, or the second conductive layer may be formed of a metal material or a metal oxide. In one embodiment, the transparent conductive material may be indium tin oxide (ITO) or indium zinc oxide (IZO).

In a particular embodiment, in the above in cell touch screen according to the embodiment of the present disclosure, the touch screen further includes a common electrode layer and the touch electrode is a part of the common electrode layer, so as to further simplify the structure of the touch screen. Accordingly, in the embodiment of the present disclosure, the common electrode is divided and multiplexed into the touch electrode. Since an insulation layer is present between the common electrode and the pixel electrode, the touch electrode will not have a signal interference with the pixel electrode in the in cell touch panel.

In particular, when the first substrate is the array substrate and the second substrate is the opposite substrate, the in cell touch screen according to the embodiment of the present disclosure is described in detail hereinafter.

The First Embodiment

Figure 8:
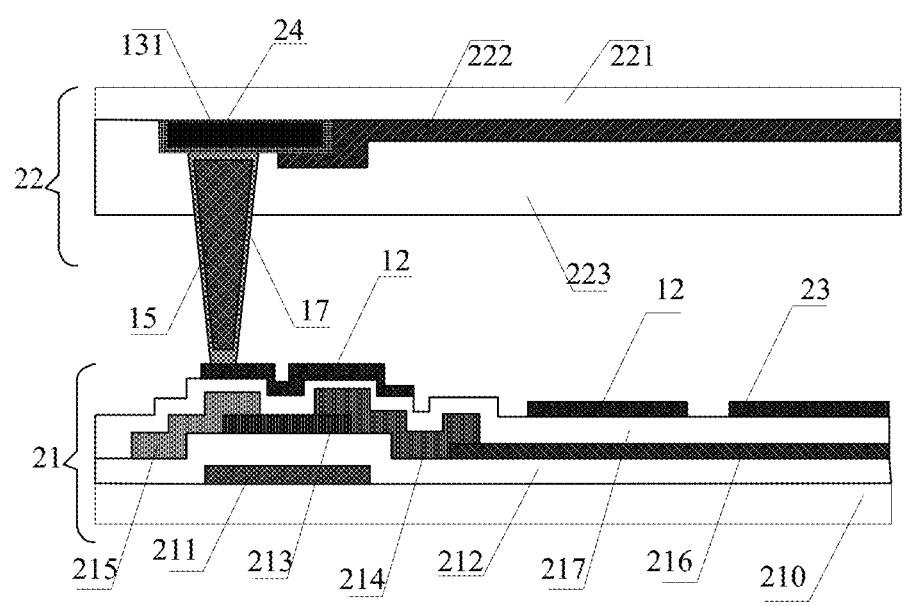
FIG. 8 is a structural schematic diagram of an in cell touch screen according to a first embodiment of the present disclosure.

Referring to FIG. 8, the in cell touch screen according to the embodiment of the present disclosure includes: an array substrate 21 and an opposite substrate 22 that are aligned, a common electrode layer 23 is provided on the array substrate 21, and a shade structure is provided on the opposite substrate 22, wherein the shade structure includes a first shade bar 131 extending along a first direction and a second shade bar extending along a second direction. In FIG. 8, only the structure of the first shade bar is illustrated. A conductive layer 24 is coated on a surface of the first shade bar, such that the first shade bar is conductive. The common electrode layer is divided and multiplexed into a plurality of touch electrodes 12 arranged in an array. In the embodiment, the conductive first shade bar serves as a signal line of the touch electrode, and each touch electrode 12 corresponds to and is electrically connected to the first shade bar 131 in one to one correspondence. The in cell touch screen further includes a supporter 15 disposed between the array substrate 21 and the opposite substrate 22. A second conductive layer 17 is coated on a surface of the supporter such that the supporter is conductive and serves to connect the touch electrode 12 and the first shade bar 131. In particular, as illustrated in FIG. 8, over the array substrate 21, it successively includes a base substrate 210, a gate electrode 211, a gate insulation layer 212, an active layer 213, a source electrode 214 and a drain electrode 215 on the base substrate 210, a pixel electrode 216 disposed in the same layer with the source electrode 214 and the drain electrode 215, and an insulation layer 217 disposed over the source electrode 214 and the drain electrode 215, wherein the common electrode layer is disposed over the insulation layer 217. Referring to FIG. 8, the supporter 15 is positioned over the structure of the thin film transistor of the array substrate 21. The opposite substrate 22 includes successively a color base substrate 221, a conductive first shade bar 131, a color resin layer 222 disposed in the same layer with the first shade bar, and an organic clad layer 223 covering the first shade bar 131 and the color resin layer 222. In the embodiment, a projection of the supporter on the array substrate or the opposite substrate is positioned within the area of a projection of the first shade bar 131 on the array substrate or the opposite substrate.

It should be noted that, the first shade bar according to the first embodiment may be the black matrix in the prior art, as long as the first conductive layer is coated on the surface of the black matrix. Optionally, when the black matrix in the prior art serves as the first shade bar, the surface of the first shade bar is coated with the first conductive layer. For example, if each touch electrode corresponds to a plurality of pieces black matrix, it is possible to coat the surface of one piece of the black matrix with the first conductive layer to form the conductive first shade bar.

The Second Embodiment

In particular, referring to FIG. 9, the in cell touch screen according to the present disclosure includes: an array substrate 21 and an opposite substrate 22 that are aligned, a common electrode layer 23 is provided on the array substrate 21, and a shade structure is provided on the opposite substrate 22, wherein the shade structure includes a first shade bar 131 extending along a first direction and a second shade bar extending along a second direction. In FIG. 9, only the structure of the first shade bar is illustrated, and the first shade bar is formed of a material with electrical conductivity and light blocking property such that the first shade bar is conductive. The common electrode layer is divided and multiplexed into a plurality of touch electrodes 12 arranged in an array. In the embodiment, the conductive first shade bar serves as a signal line of the touch electrode, and each touch electrode 12 corresponds to and is electrically connected to the first shade bar 131 in one to one correspondence. The in cell touch screen further includes a supporter 15 disposed between the array substrate 21 and the opposite substrate 22. The supporter 15 includes a conductive silicon ball such that the supporter is conductive and serves to connect the touch electrode 12 and the first shade bar 131. In particular, as illustrated in FIG. 9, over the array substrate, it successively includes a base substrate 210, a gate electrode 211, a gate insulation layer 212, an active layer 213, a source electrode 214 and a drain electrode 215 on the base substrate 210, a pixel electrode 216 disposed in the same layer with the source electrode 214 and the drain electrode 215, and an insulation layer 217 disposed over the source electrode 214 and the drain electrode 215, wherein the common electrode layer is disposed over the insulation layer 217. Referring to FIG. 9, the supporter 15 is positioned over the structure of the thin film transistor of the array substrate 21. The opposite substrate 22 includes successively a color base substrate 221, a conductive first shade bar 131, a color resin layer 222 disposed in the same layer with the first shade bar, and an organic clad layer 223 covering the first shade bar 131 and the color resin layer 222. In the embodiment, a projection of the supporter on the array substrate or the opposite substrate is positioned within the area of a projection of the first shade bar 131 on the array substrate or the opposite substrate.

Further, with respect to the supporter of the second embodiment of the present disclosure, it is possible to be designed according to the same manner and structure as those of the supporter according to the first embodiment, which will not be repeated herein.

It should be noted that, when the touch electrode and the first shade bar are positioned on the same substrate, for example, when both the touch electrode and the first shade bar are positioned on the array substrate or the opposite substrate, the electrical connection between the first shade bar and the touch electrode may be established using a scheme such as providing a via hole, which will not be particularly limited herein.

Based on the same concept, embodiments of the present disclosure further provide a method for driving the in cell touch screen according to the embodiment of the present disclosure. Referring to FIG. 10, the method includes the following steps.

In step S901, during a touch period of the touch screen, a touch detecting signal is applied respectively through a first shade bar to a touch electrode electrically connected to the first shade bar in the touch screen.

In step S902, a touch sensing signal fed back from the touch electrode in response to the touch detecting signal is received through the first shade bar.

In step S903, the area in the touch screen in which the touch took place is determined according to the difference among each touch detecting signal and touch sensing signal and the position of the touch electrode connected to the respective first shade bar.

It should be noted that, in the method for driving the in cell touch screen according to the embodiment of the present disclosure, the touch function is realized based on the in cell touch screen according to the embodiment of the present disclosure. In particular, when the touch electrode is a part of the common electrode, in the display period of one frame image, each of the touch electrode is loaded by the common electrode signal and the touch detecting signal in a time sharing manner.

Based on the same concept, embodiments of the present disclosure further provided a display device including the above in cell touch screen according to the embodiment of the present disclosure. The display device may be any product or component having a display function such as a mobile phone, a tablet computer, a television set, a monitor, a notebook computer, a digital photo frame, a navigator, or the like. The embodiment of the display device may refer to the embodiments of the above-described in cell touch screen, which will not be repeated herein.

According to the in cell touch screen, the method for driving the same, and the display device, the touch screen includes a plurality of touch electrodes and a shade structure, wherein the shade structure includes a plurality of first shade bars arranged in parallel along a first direction and a plurality of second shade bars arranged in parallel along a second direction perpendicular to the first direction. The first shade bars are conductive, and each touch electrode and each first shade bar are in one to one correspondence and are electrically connected. In the present disclosure, the first shade bars in the shade structure of the touch screen are formed to be conductive and serve as signal lines connected to the touch electrode. In particular, the first shade bare connected to the touch electrode is configured to send the touch detecting signal from the driving integrated circuit to the touch electrode, and a signal line is configured to feedback the touch sensing signal generated after the touch electrode receives the touch detecting signal to the driving integrated circuit when a human body touches the touch screen, thereby realizing the self-capacitive touch function. Accordingly, in the in cell touch screen according to the embodiment of the present disclosure, the first shade bar in the shade structure is multiplexed into a signal line, so as to realize the touch control function without affecting the aperture ratio of the touch screen.

The present disclosure may have the following advantages.

According to the in cell touch screen, the method for driving the same, and the display device, the touch screen includes a plurality of touch electrodes and a shade structure, wherein the shade structure includes a plurality of first shade bars arranged in parallel along a first direction and a plurality of second shade bars arranged in parallel along a second direction perpendicular to the first direction. The first shade bars are conductive, and each touch electrode and each first shade bar are in one to one correspondence and are electrically connected. In the present disclosure, the first shade bars in the shade structure of the touch screen are formed to be conductive and serve as signal lines connected to the touch electrode. In particular, the first shade bare connected to the touch electrode is configured to send the touch detecting signal from the driving integrated circuit to the touch electrode, and a signal line is configured to feedback the touch sensing signal generated after the touch electrode receives the touch detecting signal to the driving integrated circuit when a human body touches the touch screen, thereby realizing the self-capacitive touch function. Accordingly, in the in cell touch screen according to the embodiment of the present disclosure, the first shade bar in the shade structure is multiplexed into a signal line, so as to realize the touch control function without affecting the aperture ratio of the touch screen.

Apparently, various variations and modifications are possible to those skilled in the art without departing from the spirit and scope of the present disclosure. As such, if these variations and modifications fall within the scope of the claims and its equivalents, they are intended to be included in the scope of the present disclosure.

What is claimed is:
1. An in cell touch screen, comprising
   a plurality of touch electrodes;
   a shade structure; and
   a first substrate and a second substrate that are aligned,
      wherein:
   the shade structure comprises a plurality of first shade bars arranged in parallel along a first direction and a plurality of second shade bars arranged in parallel along a second direction perpendicular to the first direction;
   the plurality of first shade bars are conductive, and the plurality of touch electrodes are electrically connected to the plurality of first shade bars, respectively, and
   the plurality of touch electrodes and the plurality of first shade bars are disposed on different substrates, respectively,
   wherein the touch screen further comprises:
   a conductive supporter disposed between the plurality of first shade bars and the plurality of touch electrodes, and each of the plurality of touch electrodes being electrically connected to each of the plurality of first shade bars corresponding to the each of plurality of touch electrodes through the supporter.
2. The touch screen according to claim 1, wherein the shade structure is formed between sub pixels of the in cell touch screen for shading at least one of external light and light emitted from adjacent sub pixels.

3. The touch screen according to claim 1, wherein a sub pixel unit is formed by a region where the plurality of first shade bars and the plurality of second shade bars are intersected; and each of the plurality of touch electrodes corresponds to a plurality of sub pixel units.

4. The touch screen according to claim 1, wherein a first conductive layer is coated on a surface of the plurality of first shade bars.

5. The touch screen according to claim 1, wherein a projection of the supporter on the first substrate or the second substrate is positioned within an area of a projection of the plurality of first shade bars on the first substrate or the second substrate.

6. The touch screen according to claim 1, wherein a conductive silicon ball is disposed inside the supporter.

7. The touch screen according to claim 1, wherein a second conductive layer is coated on a part of a surface of the supporter, and the second conductive layer is configured to electrically connect the plurality of touch electrodes and the plurality of first shade bars corresponding to the plurality of touch electrodes.

8. The touch screen according to claim 7, wherein the second conductive layer is coated over all the surfaces of the supporter.

9. The touch screen according to claim 7, wherein the second conductive layer is a transparent conductive layer, or the second conductive layer is formed of a metal material or a metal oxide.

10. The touch screen according to claim 1 further comprising a common electrode layer, and the plurality of touch electrodes is a part of the common electrode layer.

11. A display device comprising the in cell touch screen according to claim 1.

12. A method for driving the in cell touch screen according to claim 1, wherein the method comprises:

during a touch period of the touch screen, applying, through the plurality of first shade bars, a touch detecting signal to the plurality of touch electrodes electrically connected to the plurality of first shade bars in the touch screen, respectively;

receiving, through the plurality of first shade bars, a touch sensing signal fed back from the plurality of touch electrodes in response to the touch detecting signal; and determining an area in the touch screen in which the touch took place according to the difference among each touch detecting signal and touch sensing signal and the position of the plurality of touch electrodes connected to the respective first shade bars.

* * * * *